June 22, 1954  S. A. STONE ET AL  2,681,751
CONSTRICTOR VALVE

Filed Aug. 7, 1950  5 Sheets-Sheet 1

INVENTORS:
SPENCER A. STONE
DON A. WEBER

BY
ATTORNEYS.

June 22, 1954

S. A. STONE ET AL 2,681,751

CONSTRICTOR VALVE

Filed Aug. 7, 1950

INVENTORS:
SPENCER A. STONE
DON A. WEBER

BY *Bruninga and Sutherland*

ATTORNEYS.

June 22, 1954  S. A. STONE ET AL  2,681,751
CONSTRICTOR VALVE

Filed Aug. 7, 1950  5 Sheets-Sheet 5

INVENTORS:
SPENCER A. STONE
DON A. WEBER
BY
ATTORNEYS.

Patented June 22, 1954

2,681,751

UNITED STATES PATENT OFFICE 2,681,751

CONSTRICTOR VALVE

Spencer A. Stone and Don A. Weber, Fort Wayne, Ind., assignors to The Deister Concentrator Company, Fort Wayne, Ind., a corporation of Indiana Application August 7, 1950, Serial No. 178,004

13 Claims. (Cl. 222—212)

This invention relates generally to constrictor valves, and particularly to controlling the spigot discharge from hydraulic classifiers. This is a contiinuation in part of application Serial No. 720,426, filed January 6, 1947, now abandoned.

Those familiar with the art of ore dressing recognize that optimum results from hydraulic classification are seldom obtained because of the difficulty of controlling the draw-off of the spigot product. Where a continuously open, and therefore necessarily restricted, orifice is used, it is subject to choke-ups by tramp oversize material and can only be unplugged with difficulty. Such orifices cannot be quickly or easily changed to give a greater or lesser discharge rate. They are subject to rapid abrading by the material passing through them, so that, as the diameter is enlarged, more material is discharged, and it is hard to maintain a constant rate of discharge over any length of time. Furthermore, for discharge through such restricted orifices, the pulp must be maintained rather fluid, and the spigot discharges will contain a higher percentage of water than is desirable for many applications.

To overcome some of these objections, some classifiers are equipped with plumb-bob plugs, or valves that are actuated by the weight of the bed of material and/or the density of the column of pulp above the discharge, so that when weight or density reaches a predetermined amount, the valve will open and material will discharge until weight or density is reduced, causing the valve to close. This gives an irregularly intermittent discharge of non-uniform rate, which is most objectionable where the classifier is feeding a concentrating table or similar device whose successful operation depends upon its receiving a uniform and constant feed.

The object of the present invention, generally stated, is to provide a constrictor valve suitable for use in controlling the spigot discharge of hydraulic classifiers, which can be adjusted to vary the rate of discharge, while the equipment is in operation, with assurance of constancy and uniformity, so long as the feed to the device is sufficient.

A further object is to provide such a periodically operating constrictor valve which can be adjusted by small increments and over wide variation.

Other objects will become apparent to those skilled in the art when the following description is read in connection with the accompanying drawings, in which.

In accordance with the present invention, a constrictor valve is mechanically operated to control the flow of materials from an outlet at periods of predetermined duration and predetermined interval. The invention is characterized by the provision of paired constricting members operating concurrently, alternately to constrict and open the outlet.

The invention may be utilized to provide a plurality of tube constricting organizations operating in spaced relation lengthwise of the outlet and with a time hiatus. The operation of such organizations is so coordinated that complete interruption of flow from the outlet is possible, despite the presence of tramp oversize particles.

Also within the scope of this invention is an arrangement of paired constricting members whereby while power is continuously supplied, if the closing of the constrictors is obstructed, the driving mechanism will not foul, stall or rupture.

A further feature of the invention involves an arrangement of constrictors to be automatically closed in the event of failure of the power for operating the drive.

In the utilization of the constrictor valve for controlling the spigot discharge from hydraulic classifier cells, such as vortex classifiers, where it is important to regulate the quantity-per-unit-of-time discharge in accordance with various factors, the present invention contemplates that the mechanism be readily adjustable to vary the "open time" in each cycle by minute increments and over a wide range embracing preferably 100 per cent open time to 100 per cent closed time. In certain embodiments of this invention, the mechanism is so adjustable while in operation.

Figure 1:
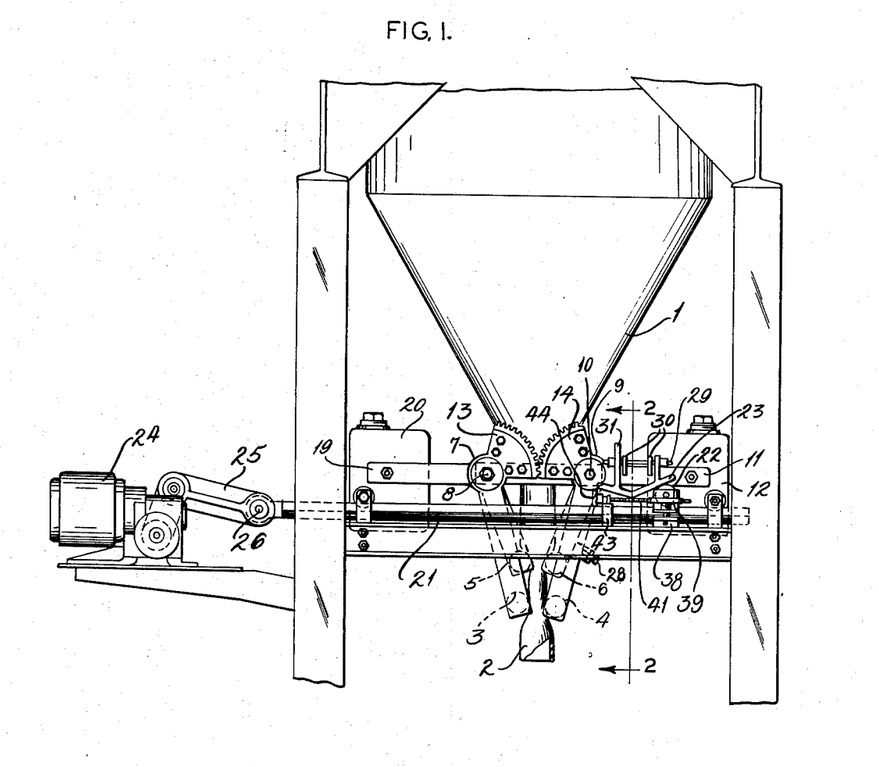
Figure 1 is a view in side elevation showing a hydraulic classifier cell provided with a constrictor valve constructed in accordance with the present invention.
Figure 2:
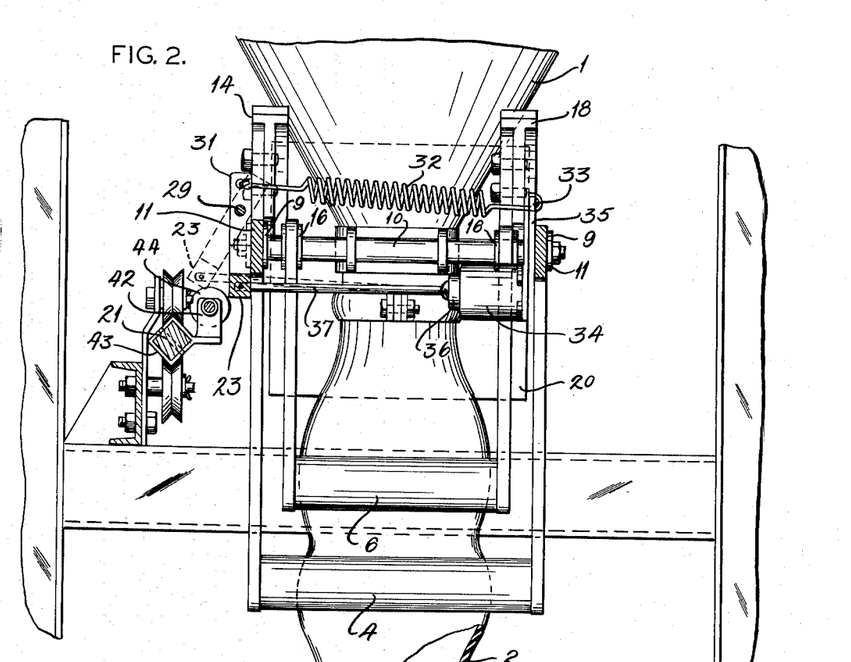
Figure 2 is a sectional view taken along line 2—2 of Figure 1.
Figures 5, 6, 7:
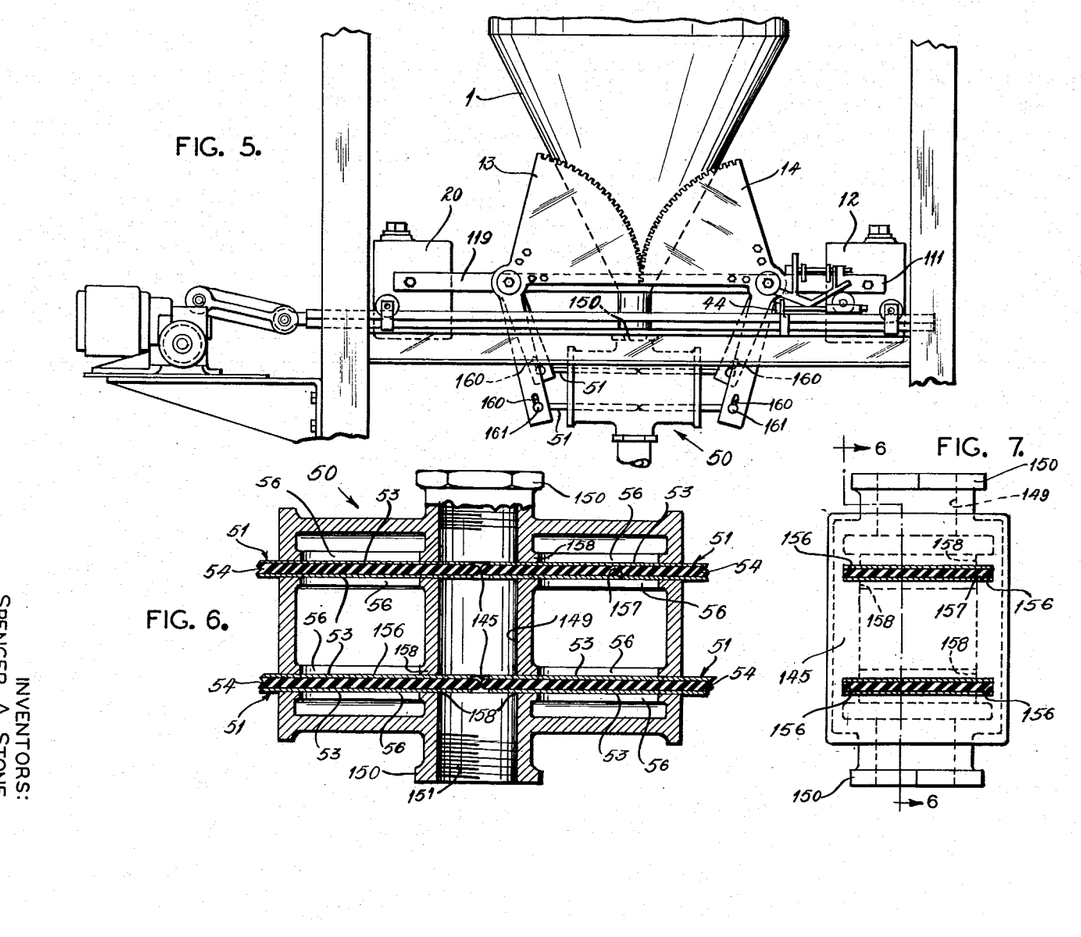
Figure 5 is a view in side elevation showing another embodiment of this invention.
Figure 6 is a sectional view taken along the line 6—6 of Figure 7.
Figure 7 is an end view of the valve body shown in Figure 5.

The constrictor valve mechanism of the present invention is applicable to a great variety of vessels, bins, etc. but is illustrated in Figures 1, 2 and 5 in connection with a hydraulic classifier cell having a conical bottom 1. Figures 1 through 4 illustrate an embodiment of mechanism in accordance with this invention wherein the discharge opening of the conical bottom 1 is provided with a collapsible tube 2. The tube 2 is preferably of rubber, but any flexible abrasion-resistant material, adapted to withstand repeated collapsings, may be utilized.

According to the embodiment of the present invention shown in Figures 1 through 4, the collapsible tube 2 is periodically constricted closed at vertically spaced points by means of a plurality of sets of clamping jaws 3—4 and 5—6. The jaw 3 is a generally U-shaped structure having bosses 7 at each extremity thereof, and mounted for rotation upon a shaft 8, suitably supported adjacent the spigot outlet of cell 1.

Similarly, the jaw 4 is provided with bosses 9 for rotation upon a shaft 10, mounted in like manner to the shaft 8, but on the opposite side of the spigot outlet from cell 1. Extending from the region of the bosses 9, however, are arms 11 arranged to support a counterweight 12. The relation of these parts is apparent from Figure 3 where, for clarity of illustration, the shafts 8 and 10 are shown out of parallel, but it will be understood that, when in operative position, said shafts 8 and 10 are mounted parallel and in the same horizontal plane as shown in Figure 1.

A gear segment 13 is secured to the jaw 3, and a corresponding gear segment 14 is secured to the jaw 4, said gear segments being in mesh, so that, upon movement of either of the jaws 3 and 4 about their respective axes 8 and 10, movement in corresponding degree, but opposite direction of the other jaw, takes place. In the arrangement shown, the weight 12 continuously biases the jaw 3 and 4 in the direction toward each other, so as to constrict the tube 2 between the same. The mass of the weight 12 is regulated in accordance with the characteristics of the material to be conducted through the tube 2 so that the moment provided by the weight 12 is sufficient to completely shut off the flow through tube 2.

The set of jaws 5—6 is similarly organized, being mounted respectively upon the same shafts 8 and 10 as were the jaws 3 and 4. In the embodiment shown, bosses 15 for the jaw 5 are arranged between bosses 7 for the jaw 3, and likewise bosses 16 for the jaw 6 are arranged between the bosses 9 for the jaw 4. It will also be observed that the radial displacement of the jaws 5 and 6 from their axes, respectively, is substantially less than the radial displacement of the jaws 3 and 4 from their axes, respectively. Consequently, the jaws 5 and 6 engage the tube 2 at a substantial distance above the point at which jaws 3 and 4 engage the same. As was the case with jaws 3 and 4, jaws 5 and 6 are interlocked by gear segments 17 and 18, which are situated on the remote side of the outlet from cell 1, as seen in Figure 1.

From the bosses 15 of jaw 5, arms 19 extend laterally in a manner comparable to the relation hereinbefore described in connection with arms 11 of jaw 4. A weight 20 is supported between arms 19 in such manner as to continuously bias the jaws 5 and 6 toward each other, and the mass thereof is regulated so that the moment exerted thereby is sufficiently to overcome the resistance of the tube 2 and the material flowing therein, and thereupon produce constricting of the tube for shut-off of flow therethrough.

The organization of parts just described tends continuously to constrict the tube 2 at two vertically spaced regions. In order to permit the flow of material through the tube 2, mechanism is provided for periodically retracting the respective sets of jaws 3—4 and 5—6, and for varying the increment of time during which such jaws are held out of tube-constricting position. In the embodiment shown in Figures 1 through 4 and also in that shown in Figure 5, such means takes the form of a reciprocating bar 21 (suitably supported and guided for horizontal movement relative to the cell 1 and other stationary parts) having a roller 22 adjustable lengthwise thereof, and arranged to engage a cam track 23, the latter being mounted upon one of the arms 11 of jaw 4. Reciprocation of the bar 21 is accomplished by any suitable means, such, for example, as an electric motor 24 driving a pitman 25 connected to bar 21 through wrist pin 26.

The operation of such an organization of parts will be apparent to those skilled in the art. When the rod 21 is drawn to the left, as seen in Figure 1, roller 22 forces cam 23 upwardly with resultant counter-clockwise rotation of arms 11 and jaw 4 about shaft 10. The interconnection of the jaws 3 and 4 through gear segments 13 and 14 causes jaw 3 to rotate in the clockwise direction.

Figure 3:
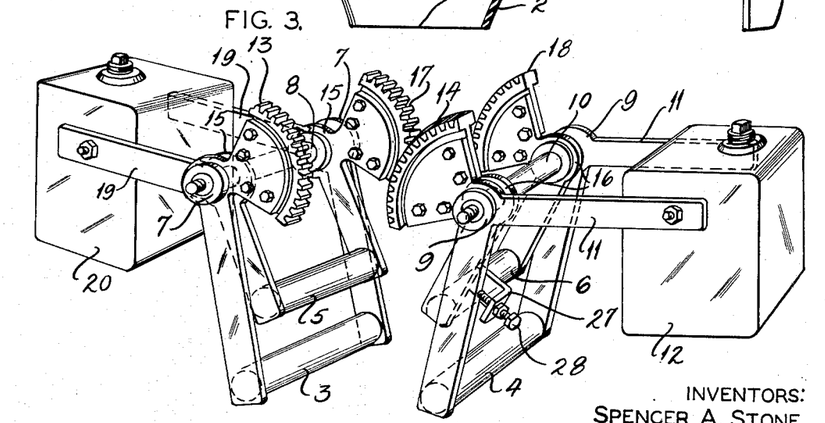
Figure 3 is a perspective view showing the arrangement of constricting jaws.
Figure 4:
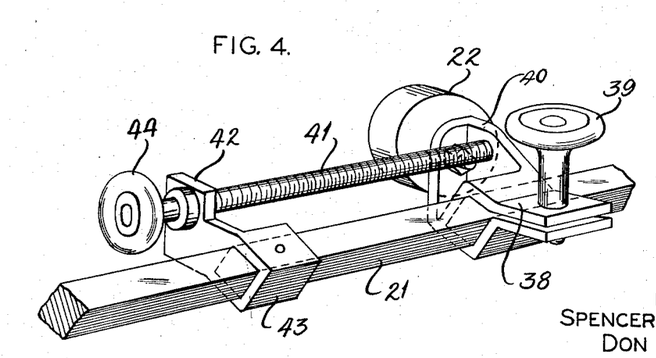
Figure 4 is a perspective view of the mechanism for varying the time period of flow through the constrictor valve.

In order to transmit opening movement from the set of jaws 3—4 to the set of jaws 5—6, the jaw 6 is provided with a lug 27 having an adjustable set screw 28 arranged for engagement with one leg of jaw 4 when the latter moves counter-clockwise (as seen in Figure 3). The set screw 28 may be adjusted, so as to provide the desired time lag between the opening of jaws 3—4 and the opening of jaws 5—6. The mechanical interconnection between said sets of jaws, however, leaves the jaw 4 free for clockwise rotational movement relative to jaw 6, so that, if and when movement of jaws 5—6 to the position necessary to completely constrict tube 2 is obstructed, as by the presence of tramp oversize material in the tube 2 at that point, such obstruction does not interfere with the movement of jaws 3 and 4 to the position whereat the tube will be completely constricted by them. On the contrary, if both sets of jaws will be in completely constricted position, the mechanical interconnection through lug 27 and set screw 28 provides a desirable lost motion, so that the opening of jaws 5—6 lags behind the opening of jaws 3—4.

It will be observed that, while the power-operated driving means in the embodiment shown is effective to positively move both sets of jaws away from tube-constricting position, there is no positive connection capable of moving the jaws into tube-constricting position, the latter being accomplished solely by the bias of weights 12 and 20. As before mentioned, when the rod 21 moves roller 22 leftwardly from the position shown in Figure 1, the jaws are opened and held open so long as the leftward movement of roller 22 continues through a stroke mechanically limited to the maximum length afforded by the face of cam 23. Rightward movement of the rod 21 with roller 22 permits the jaws to move toward closing position, but such movement is retarded by the engagement of roller 22 with cam track 23.

It is contemplated that the motor 24 be continuously operating so as to periodically open the jaws 3—4 and 5—6 for time periods determined by the position of roller 22 on rod 21, but in order to assure that, if and when operation of motor 24 is interrupted, as upon power failure or otherwise, the jaws 3—4 and 5—6 will not remain in open position, provision is made for completely disconnecting the power-operating means from the jaws. Upon such release, the bias of weights 12 and 20 automatically urges the jaws to tube-constricting position.

The last mentioned aspect of the invention may take any of a great variety of forms, but, in the embodiment shown in Figures 1 through 4 and also in that shown in Figure 5, consists of mounting the cam track 23 upon a hinge pin 29 carried by lugs 30 on one of the arms 11. Extending above the hinge pin 29 is a short arm 31, to which is connected a coil spring 32 whose opposite end is anchored to the opposite arm 11, as shown at 33, so that the tension of spring 32 constantly tends to rotate cam member 23 to the position shown in dotted lines in Figure 2. In order to maintain the cam member 23 in full line position shown in Figure 2 under all operative conditions, a solenoid 34 is mounted through bracket 35 to the arm 11 opposite that which carries cam 23. The solenoid 34 may be of any suitable type, and is so connected in electrical circuit with the motor 24 that, upon energization of the motor, the solenoid is likewise energized, but, upon interruption of the power to the motor the solenoid is deenergized. In the embodiment shown, the solenoid 34 is of the pull type having a plunger 36, to which is connected a link 37, whose opposite end is pinned to the cam member 23. Consequently, so long as the solenoid is energized, the force thereof is sufficient to overcome the force of spring 32 and maintain cam member 23 in the operative position. On the contrary, when the solenoid 34 becomes deenergized, the force of spring 32 operates, as aforesaid, to rotate the cam member into dotted line position, whereat it can no longer engage with roller 22.

From the foregoing description those skilled in the art should readily understand that, as the rod 21 reciprocates back and forth pursuant to operation of the motor 24, the clamping jaws 3—4 and 5—6 are periodically retracted out of tube constricting position with the jaws 5—6 slightly lagging (on retraction) the jaws 3—4. While the motor 24 positively drives the jaws 3—4 and 5—6 out of tube-constricting position, the reverse movement of the clamping jaws is generated through the weights 12 and 20, so that, upon movement toward the tube-constricting position, the jaws 5—6 will normally precede the jaws 3—4. If, however, an oversize particle becomes engaged between jaws 5—6, these jaws may not move to the extreme closed position and consequently the discharge through tube 2 will not be shut off fully. In this event, however, there is nothing to restrain complete closure at jaws 3—4 because, due to the time lag between the closing of the respective sets of jaws, the tube adjacent jaws 3—4 will have cleared itself of material, except that of sufficiently small particle size to pass the partially constricted portion adjacent jaws 5—6. As pointed out hereinbefore, constriction solely by the influence of the biasing means not only prevents damage to the mechanical parts of the drive mechanism, but avoids damage to the interior of tube 2 such as might occur if the jaws 5 and 6 (or a single set of jaws) were driven to their extreme position despite the presence of an oversize particle thereadjacent. In the latter event, internal damage to the tube would take place even though the closing force be great enough to crush the entrapped particle.

By adjusting the position of roller 22 longitudinally of rod 21, the time period during which the tube 2 may remain open during each cycle may be regulated. This is accomplished, in the embodiment illustrated, by mounting the roller 22 upon a clamp bracket 38 arranged to be drawn taut on rod 21 by a hand nut 39. Upon release of the hand nut 39, the clamp bracket 38 may be slid lengthwise of rod 21. Clamp bracket 38 has a flange 40, through which an adjusting screw 41 passes in threaded engagement. The other end of screw 41 is mounted for rotation, but without freedom for relative longitudinal movement, in a flange 42 on a collar 43, which latter is fixed, as by welding or pinning, to rod 21. A hand wheel 44 is mounted on screw 41 for easy adjustment of the latter. As can readily be seen from Figures 1, 2 and 5, the rod 21 extends along one side of the apparatus, exteriorly of arms 11 and 19, weights 12 and 20 and gear segments 13 and 14. As shown in Figures 1 and 5, adjusting screw 41 is made as long as cam 23 and hand wheel 44 is so positioned along rod 21 as always to be clear of cam 23 longitudinally of the rod 21. As can be appreciated from Figure 4, hand nut 39 is positioned on the side of rod 21 away from cam 23. Thus hand nut 39 and hand wheel 44, while reciprocating on rod 21, are both clear of all of the remaining moving elements of this device and are easily and safely accessible, even while the device is in operation. With this arrangement of parts, it is possible not only to adjust the position of roller 22 longitudinally of rod 21 while the apparatus is in operation, but to make such adjustments in infinitesimally small increments and through a wide range of variation between the limits of 100% open time and 100% closed time. The frequency of the openings and closings may be varied by controlling either the speed of the motor 24 or by introducing an appropriate reduction gearing between the motor and the pitman. The rate of opening and closing may be regulated by appropriately shaping cam 23, reversing the direction of force on the cam (as by causing rod 21 to push instead of pull), or otherwise, in order to achieve the optimum operating characteristics for any given installation.

In Figures 5 through 8, another embodiment of this invention is illustrated. In this embodiment, the constrictor valve comprises a valve body 50 within which slide oppositely acting gate-like constricting members 51. These constricting members are paired in the same manner as are the jaws of the preceding embodiment.

As shown in Figures 6 and 7, the valve body 50 is provided with a central passage 149 which may be flanged at each end, as at 150, and threaded for connection to a pipe, as at 151. Constricting members 51 slide within the valve body 50 between guides 56 and in substantially sealing relation thereto. Guides 56 have guide grooves 156 and supporting surfaces 157. Supporting surfaces 157 end at the periphery of the central passage 149, forming terminal ledges 158. In the illustrative embodiment of valve body shown in Figures 6 and 7, supporting surfaces 157 are partly cut away, and valve body 50 is cored between and around upper and lower guides 56 to save material costs and reduce weight. This precise form of valve body 50 is, however, not essential to the invention.

The guide grooves 156 of guides 56 traverse the central passage 149 of valve body 50, so that constricting members 51, sliding snugly in those grooves, substantially seal off flow from the outlet along their side edges. Provision is made along the leading edge of the constricting members for some form of seal, so that when the paired constricting members are butted, flow of material through the outlet is cut off. It may be found necessary or desirable, depending upon the type of material to be handled and the construction of constricting members 51, to provide additional sealing means, such as packing, along guide grooves 156 and ledges 158.

In the embodiment shown in Figure 5, constricting members 51 are operated by arms 111 and 119, similar to the arms 11 and 19 of the embodiment shown in Figures 1 through 4, except that slots 160 are provided, in which shafts 161 are slideably mounted. Shafts 161, extending through sleeves 58 of constricting members 51, carry those constricting members. The arrangement of gear segments to connect and drive the arms 119 and 111 is the same as that of the embodiment shown in Figures 1 through 4. Gear segments 13 and 14 in the embodiment shown in Figure 5 must be proportioned to mesh, and the weight of counterweights 12 and 20 must be made suitable for operating constricting members 51 but the remaining mechanism for operating arms 111 and 119 may be identical with that of the embodiment shown in Figures 1 through 4. The same reference characters are used to designate this mechanism in Figures 1 through 4 and in Figure 5. The operation of the arm-operating mechanism is also the same and will not be further described.

Figure 8:
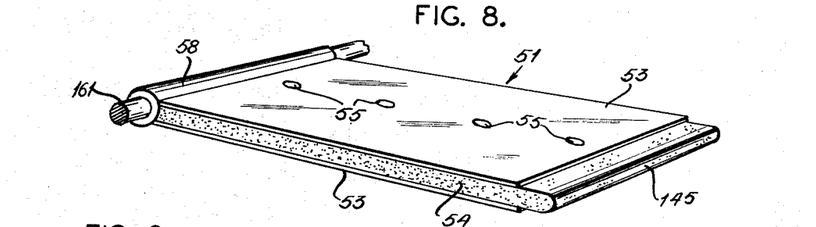
Figure 8 is a perspective view of the embodiment of constricting member in use in the embodiment of this invention shown in Figures 6 and 7.

In Figure 8, constricting member 51 comprises upper and lower plates 53 with a sheet of resilient material 54, such as rubber or the like, sandwiched between them and the whole secured by fasteners 55. The resilient material 54 extends beyond the plates 53 at the leading edge 145 of the constricting member 51 to form a sealing surface. A sleeve 58 for mounting constricting members 51 on shaft 161 may be formed integral with plates 53 or may be separately attached. Plates 53 may be made of steel, bronze, or other suitable metal, or of plastic or other non-metallic material, depending upon the use to which the constrictor is to be put. Plates 53 supply rigidity and a bearing surface. The sheet of rubber or similar resilient material extending through the entire width and a substantial part of the length of the constricting member 51 as shown in Figure 8 not only forms a tight seal along the leading edges 145 when two constricting members are butted, but also tends to seal the sides of the constricting members within the guide grooves 156 because the compression of the butting edges of the rubber sheet tends to thicken or "upset" the remainder of the sheet to fill the guide grooves and form a seal. It can be appreciated that constricting members 51 may be constructed in various forms to produce a similar result. For example, a metal plate covered with rubber or the like may be used. The rubber in that case tends to "upset" when butted, not only in the guide grooves 156 but along ledges 158. If a suitable auxiliary packing is provided, as within grooves 156 and along terminal ledges 158, or in those situations such as in the delivery of relatively coarse dry materials, or a thick slurry, in which the material delivered from the outlet does not tend to escape through guides 56, constricting members 51 may comprise simple metal plates with a strip of resilient material provided along the leading edges of the constricting members, or the leading edges of the constricting members may be grooved to form a satisfactory seal without the use of resilient material.

As has been stated, the operation of the embodiment of this invention shown in Figure 5 is similar to that of the embodiment shown in Figures 1 through 4, except that constricting members 51, sliding within guides 56 in the valve body 50 are extended beyond ledges 158 into the central passage 149 and butted to shut off the flow of material from the outlet and are retracted into guides 56 to open the outlet.

Figure 9:
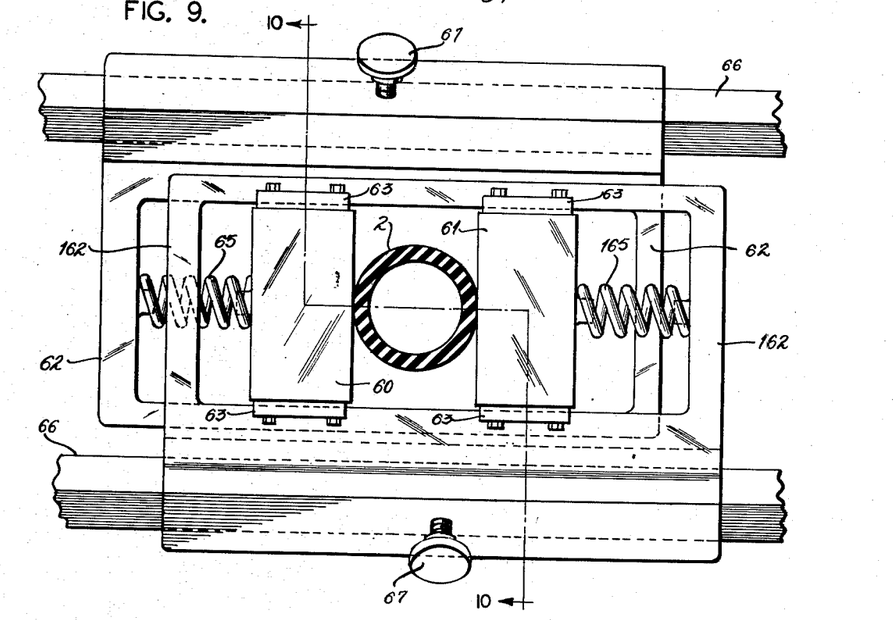
Figure 9 is a plan view of still another embodiment of this invention.
Figure 10:
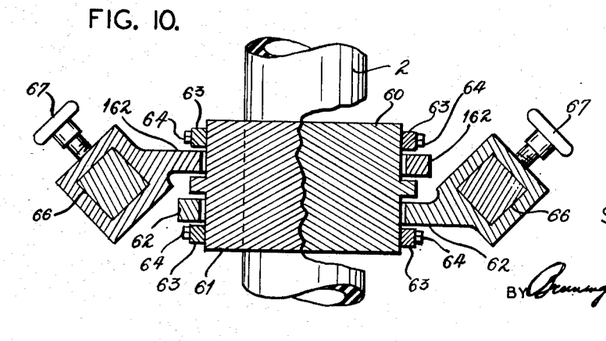
Figure 10 is a sectional view taken along the line 10—10 of Figure 9.

Still another embodiment of this invention is illustrated in Figures 9 and 10. In this embodiment, a collapsible tube 2 like that of the embodiment shown in Figures 1 through 4 is again employed. The constricting members consist of a pair of jaw blocks 60 and 61 slideably mounted in a pair of frames 62 and 162, by means of guide blocks 63, secured by bolts 64. Spring 165, mounted against frame 162 at one end and against block 61 at the other, biases block 61 toward tube 2. Spring 65, mounted against frame 62 at one end and against block 60 at the other, biases block 60 toward tube 2. The frames 62 and 162 are mounted to slide independently of one another through their limited travel and are reciprocated by rods 66 to which the frames are adjustably secured by means of set screws 67. Rods 66 are driven 180° out of phase with one another by a power source, not shown, through a double crack or similar reciprocating-motion-producing means so that blocks 60 and 61 are concurrently driven first toward the tube 2 and then away from tube 2. It can be seen that the arrangement of springs 65 and 165 is such that if an oversize piece of material be caught in tube 2 when blocks 60 and 61 are being driven toward one another, the springs 65 and 165 will be compressed so that neither the apparatus nor the tube will be injured. The "open time" during each cycle of operation of this embodiment is readily adjusted by changing the position of the frames 62 and 162 along the rods 66. When the rods 66 are in their most outwardly extended position with respect to tube 2, by loosening set screw 67, moving the frames 62 and 162 toward the tube 2 until the jaw blocks 60 and 61 completely constrict the tube 2, and retightening the set screws 67, the "open time" of tube 2 is reduced to zero. Springs 65 and 165 are merely compressed as the rods 66 drive the frames toward the tube 2. To obtain 100% "open time," it is only necessary to set the frames 62 and 162 when rods 66 are in their most inwardly extended position with respect to tube 2 so that blocks 60 and 61 do not constrict tube 2. An infinite number of adjustments lies between the two extremes.

Set screws 67 are positioned to extend away from blocks 60 and 61 and rods 66 so as to be easily and safely accessible, even when the apparatus is in operation. It is readily apparent that the "open time" of the outlet with this embodiment may be adjusted while the device is in operation. Such adjustment may be facilitated by marking along rods 66 the 100% open and 100% closed positions of the frames 62 and 162, and as many intermediate positions as may be found desirable. It can also be appreciated that less simple adjusting means may be employed, such as a rack and pinion, or an arrangement similar to that shown in Figure 4, for adjusting the position of the frames. Just as in the embodiments shown in Figures 1–5, the duration of any cycle can be varied by varying the speed at which the rods 66 are driven by the power source.

Figure 11:
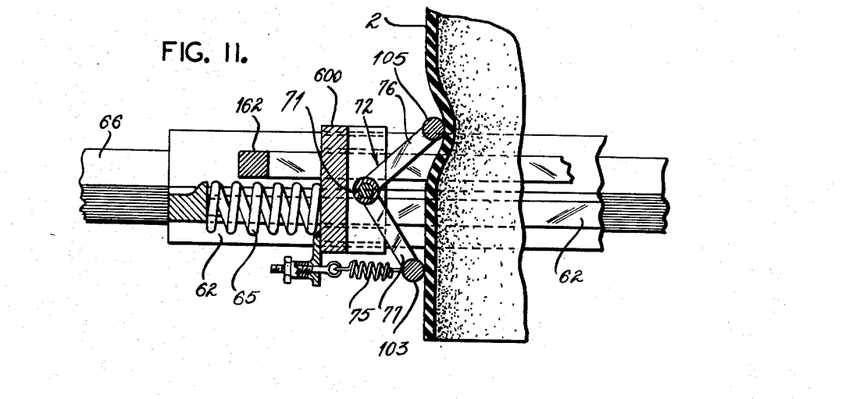
Figure 11 is a sectional view showing still another embodiment of this invention.

Instead of constricting the tube 2 by direct engagement with slide blocks as in the previous embodiment, the same driving parts may be employed to actuate a pair of bell cranks into and out of engagement with tube 2 so as to secure two spaced zones of constriction with a time hiatus. Accordingly each of blocks 60 and 61 may be replaced by a block 600 (one only of which is shown in Figure 11). Each of the blocks 600 supports a shaft 71 upon which is hinged a pair of bell cranks 72. Between the bell cranks of each pair, jaw bars 103 and 105 extend in a manner similar to jaws 3 and 5 of Figures 1 through 4, so as to engage tube 2. A spring 75 is attached to one leg 77 of the bell cranks 72 and is secured at its other end to block 600 so as to bias the bell cranks in a direction such that the upper jaw bars 105 engage the tube 2 before the lower jaw bars 103 so engage. If however, due to the presence of oversize material, complete closure of jaws 105 is obstructed, spring 75 yields to permit jaws 103 to effect the constriction.

Figure 12:
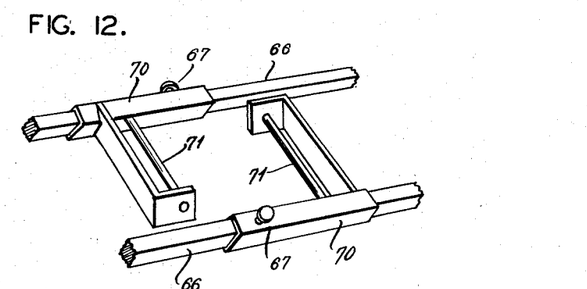
Figure 12 is a view in perspective of bracket elements of another embodiment of this invention.

With the bell crank jaw arrangement of Figure 11 a simplified mode of mounting the same on bars 66 may be utilized as shown in Figure 12. In this case a bracket 70 is slideably mounted on each of bars 66 and adjustably secured thereto by set screw 67 which as in the previous embodiment is positioned so as to be readily accessible for adjustment while the device is operating.

Figure 13:
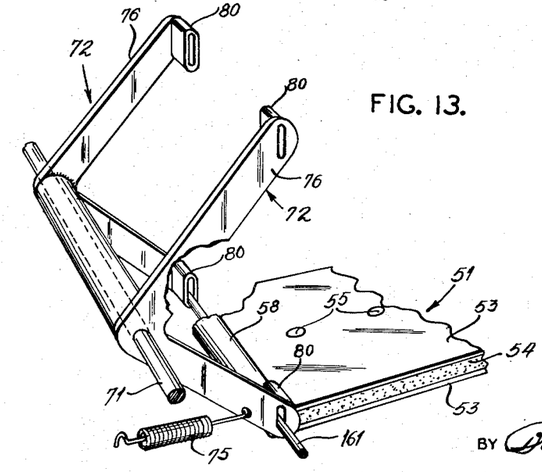
Figure 13 is a perspective view of a bell crank for use with the embodiments of this invention shown in Figures 8 and 12.

As shown in Figure 13, the bell crank arrangement also lends itself to use in actuating the slideable constricting members within valve body 50 of Figures 5 through 8. In this case, the shafts 161 (which connect with the constricting members 51) are received in slotted bosses 80 on the extremities of the bell cranks 72. It will be understood that the shaft 71 which mounts the bell cranks 72 may, as in the previous embodiment, be mounted on a bracket 70 as shown in Figure 12 or on a block 600 as shown in Figure 11.

It can be seen that with either the embodiment of bell crank shown in Figure 11 or that shown in Figure 13, the upper constricting members will tend to constrict the outlet first, after which the bell cranks will be rocked about their pivots against the bias of springs 75 to bring the lower constricting members into operation. Thus, the pivoting of the bell cranks 72 about the shafts 71 and the biasing toward the outlet of the upper arms 76 produce, with respect to the outlet, a limited lost motion connection, the net effect of which is very similar to that of the lost motion connection shown in the embodiments of this invention illustrated in Figures 1 through 3, and 5.

Similarly, the lower arm 77 of the bell crank is first biased away from the constricting position in opening. However, if the upper constricting members are obstructed in closing, the lower members are swung against the bias of springs 75 to close the outlet nevertheless.

Each of the embodiments shown and described has included a pair of oppositely disposed constricting elements reciprocated alternately and concurrently toward one another and away from one another. In those embodiments employing a plurality of pairs of constricting members, provision has been made for a limited lost motion connection between separate pairs so that all of the constricting members move in the same direction concurrently to open and close the outlet, though in staggered time relation. Each of the embodiments has been adjustable while the apparatus is in operation, by virtue of its structure.

From the foregoing description, those skilled in the art can readily understand the construction and operation of the invention and realize that it accomplishes the objects aforesaid. While a complete disclosure of several embodiments has been given for the purpose of illustration, it is not to be understood that the invention is limited to the details of those embodiments. On the contrary, many modifications of the apparatus will immediately occur to those skilled in the art without departing from the spirit of the invention or the scope of the appended claims.

Having thus described the invention, what is claimed and desired to be secured by Letters Patent is:

1. Apparatus of the kind described comprising, a constrictable tube, a plurality of clamping jaws arranged to constrict said tube at separate regions spaced lengthwise of the tube, all said jaws being biased to constricting position, power means for periodically positively driving one of said clamping jaws away from constricting position, and a lost motion connection between said driven jaw and another jaw spaced therefrom whereby said jaws are opened together with one lagging the other.

2. Apparatus of the kind described comprising, a constrictable tube, a plurality of clamping jaws arranged to constrict said tube at separate regions spaced lengthwise of the tube, means for biasing all said jaws to constricting position independently of any external power source, and power means for periodically positively driving said clamping jaws concurrently away from constricted position and for periodically releasing all said jaws for movement toward constricting position.

3. Apparatus of the kind described comprising, a constrictable tube, a plurality of clamping jaws arranged to constrict said tube at separate regions spaced lengthwise of the tube, all said jaws being biased to constricting position, electrically operated power means for periodically positively driving said clamping jaws concurrently away from constricted position, and a releasable connector betwen said power means and said clamping jaws, biased toward releasing position, but maintained in connecting position by power from the source which energizes said power means, hence responsive to failure of power to disconnect said jaws from said power means.

4. In combination with a hydraulic classification cell having a discharge opening at the bottom thereof and a collapsible tube extending downwardly from said opening, tube-constricting means comprising, a plurality of sets of hinged jaws, the jaws in each set being geared together for concurrent rotation in opposite directions, a lost motion connection between the jaws of different sets, said respective sets of jaws being engageable with said tube to constrict the same at different positions lengthwise thereof, means independently biasing each of said sets' jaws to tube-constricting position, a cam connected to one of said jaws, continuously operating power means for periodically actuating said cam in a direction such as to move said jaw away from tube-constricting position, and means responsive to failure of power to render said cam inoperative.

5. Apparatus of the kind described comprising, a constrictable tube, a plurality of clamping jaws arranged to constrict said tube at separate regions spaced lengthwise of the tube, all said jaws being biased to constricting position, a cam associated with said clamping jaws, a continuously driven member having a part arranged to engage said cam and during part of its cycle of movement to move all the jaws out of constricting position concurrently, and means for adjusting the position of said part relative to said member to vary the time period during which said jaws remain out of constricting position.

6. Apparatus for regulating the flow of materials through an outlet, comprising paired constricting members oppositely disposed about said outlet and biased toward said outlet by springs, means for imparting complemental motion with respect to said outlet concurrently to each of said paired constricting members, and power means for driving said constricting members, said springs providing a limited lost motion connection between each of said constricting members and said power means to allow continued operation of said power means when said outlet is obstructed without damage to said apparatus or said outlet.

7. Apparatus for regulating the flow of materials as defined in claim 6, wherein the oppositely disposed constricting members are blocks, said blocks being slideably mounted in independently slideable frames, springs mounted to be driven by said frames, said springs biasing said blocks toward said outlet.

8. In an apparatus for regulating the flow of materials as defined in claim 6, wherein the constricting members comprise a pair of reciprocating brackets oppositely disposed about said outlet, and a pair of constricting-member carrying bell-cranks pivoted at their centers on said brackets, a corresponding constricting-member-carrying leg of each of said bell-cranks being biased toward the outlet with respect to the other constricting-member-carrying leg of each of said bell-cranks.

9. An apparatus for regulating the flow of materials as defined in claim 6, wherein the constricting members comprise a pair of concurrently reciprocating brackets oppositely disposed about said outlet, bell-cranks mounted on each of said brackets, and upper and lower constricting members carried by the legs of said bell-crank, said upper constricting members being spring biased toward the outlet with respect to the lower constricting members.

10. Apparatus for regulating the flow of materials as defined in claim 6, wherein the constricting members are blocks, each of said blocks being slideably mounted in an independently slideable frame driven by said moving means, springs biasing said blocks toward said outlet, and bell-cranks pivotally mounted on said blocks and carrying upper and lower constricting members, said upper constricting members being spring biased toward the outlet with respect to the lower constricting members.

11. Apparatus for regulating the flow of materials through an outlet comprising paired constricting members oppositely disposed about said outlet, power driven reciprocating rod means for moving said constricting members concurrently toward and concurrently away from each other to close and open said outlet, said rod means being disposed exteriorly of said constricting members, and adjusting means for varying the "open time" of said outlet, mounted along said rod means to reciprocate with said rod means and positioned to be clear of said constricting members and to be accessible for adjusting the "open time" of the outlet when the apparatus is in operation.

12. Apparatus of the kind described comprising a constrictable tube, a plurality of constricting members arranged to constrict said tube at separate regions spaced lengthwise of the tube, all of said constricting members being normally biased toward constricting position independently of any external power source, power means for periodically positively driving one of said constricting members away from constricting position, and a lost motion connection between said driven constricting member and another constricting member spaced therefrom whereby said constricting members are moved from constricting position together with one lagging the other.

13. Apparatus for regulating the flow of materials as defined in claim 11, having a valve body in said outlet, and the paired, oppositely disposed constricting members being slidable within said valve body.

References Cited in the file of this patent

UNITED STATES PATENTS

| Number | Name | Date |
|---|---|---|
| 210,334 | Kinsman | Nov. 26, 1878 |
| 1,108,128 | Buffum | Aug. 25, 1914 |
| 1,667,141 | Crowley | Apr. 24, 1928 |
| 2,112,592 | MacClatchie | Mar. 29, 1938 |
| 2,129,055 | Gibbs | Sept. 6, 1938 |
| 2,183,835 | Foulke | Dec. 19, 1939 |
| 2,313,550 | Huber | Mar. 9, 1943 |
| 2,356,212 | Burdette et al. | Aug. 22, 1944 |
| 2,371,434 | Eppler | Mar. 13, 1945 |
| 2,418,821 | Coghill et al. | Apr. 15, 1947 |

FOREIGN PATENTS

| Number | Country | Date |
|---|---|---|
| 126,702 | Great Britain | May 22, 1919 |